United States Patent
Cao

(10) Patent No.: US 10,462,028 B2
(45) Date of Patent: Oct. 29, 2019

(54) EFFICIENT ETHERNET SIGNAL TRANSPORT AND SCHEDULING

(71) Applicant: Huawei Technologies Co., Ltd., Shenzhen (CN)

(72) Inventor: Shiyi Cao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 420 days.

(21) Appl. No.: 15/210,457

(22) Filed: Jul. 14, 2016

(65) Prior Publication Data
US 2016/0323164 A1 Nov. 3, 2016

Related U.S. Application Data

(63) Continuation of application No. PCT/CN2014/070593, filed on Jan. 14, 2014.

(51) Int. Cl.
*H04L 12/26* (2006.01)
*H04L 12/911* (2013.01)
*H04L 29/06* (2006.01)

(52) U.S. Cl.
CPC ........ *H04L 43/0811* (2013.01); *H04L 47/822* (2013.01); *H04L 69/12* (2013.01)

(58) Field of Classification Search
CPC ..... H04L 43/0811; H04L 47/822; H04L 69/12
See application file for complete search history.

(56) References Cited

U.S. PATENT DOCUMENTS

| | | | |
|---|---|---|---|
| 8,385,374 B1 | 2/2013 | Wohlgemuth | |
| 9,705,777 B2* | 7/2017 | Giannakopoulos | H04L 43/12 |
| 9,787,429 B2* | 10/2017 | Bansal | H04L 1/0041 |
| 9,826,410 B2* | 11/2017 | Kummetz | H04W 88/085 |
| 2001/0014104 A1* | 8/2001 | Bottorff | H04J 3/1617 370/471 |
| 2005/0058149 A1* | 3/2005 | Howe | H04L 47/10 370/428 |
| 2005/0102419 A1 | 5/2005 | Popescu et al. | |

(Continued)

FOREIGN PATENT DOCUMENTS

| | | |
|---|---|---|
| CN | 101447675 A | 6/2009 |
| CN | 101447975 A | 6/2009 |

(Continued)

OTHER PUBLICATIONS

"Series G: Transmission Systems and Media Digital Systems and Networks; Digital terminal equipments-General; Series Y: Global Information Infrastructure, Internet Protocol Aspects and Next-Generation Networks; Internet protocol aspects-Transport; Interfaces for the optical transport network," Recommendation ITU-T G709/Y.1331 Amendment 2, International Telecommunications Union, Geneva, Switzerland (Oct. 2013).

*Primary Examiner* — Mohamed A. Wasel
(74) *Attorney, Agent, or Firm* — Leydig, Voit & Mayer, Ltd.

(57) ABSTRACT

An Ethernet signal transport method includes: inserting, by a first network device, path monitoring information into a position that is a preset bit length away from an alignment marker (AM) in a physical coding sublayer lane (PCSL) of an Ethernet signal; and sending, by the first network device to at least one second network device, a signal bearing the PCSL into which the path monitoring information is inserted.

9 Claims, 10 Drawing Sheets

(56) References Cited

U.S. PATENT DOCUMENTS

| | | | |
|---|---|---|---|
| 2006/0077991 A1* | 4/2006 | Kawarai | H04L 12/43 370/403 |
| 2007/0286069 A1* | 12/2007 | Xu | H04L 41/0677 370/218 |
| 2008/0163021 A1* | 7/2008 | Ohira | H03M 13/1515 714/746 |
| 2009/0060531 A1* | 3/2009 | Biegert | H04L 12/2856 398/214 |
| 2010/0208753 A1* | 8/2010 | Brown | H04L 25/4908 370/476 |
| 2011/0149772 A1 | 6/2011 | Han | |
| 2011/0261682 A1 | 10/2011 | Han | |
| 2012/0155486 A1 | 6/2012 | Ahn et al. | |
| 2013/0004156 A1* | 1/2013 | Yang | H04B 10/0793 398/17 |
| 2013/0077623 A1 | 3/2013 | Han | |
| 2016/0294990 A1* | 10/2016 | Cao | H04L 69/323 |
| 2017/0054997 A1 | 2/2017 | Lin | |

FOREIGN PATENT DOCUMENTS

| | | |
|---|---|---|
| CN | 102883163 A | 1/2013 |
| JP | 2012039176 A | 2/2012 |

\* cited by examiner

| TCM3 | Multiplex section monitoring | Reserved overhead of a regenerator section | General communication channel of a regenerator section | Regenerator section monitoring | Synchronization |
|---|---|---|---|---|---|
| STAT / BDI / BEI/BIA / BIP8 | STAT / BDI / BEI / BIP8 | RES | GCC0 | RES / IAD E I / BEI/BIA | 0 1 |

← OH1

| General communication channel of a multiplex section | Additional information request | Latency test | | | | Synchronization |
|---|---|---|---|---|---|---|
| GCC1 | ACK / RES / TYP / PM&TCM | STAT / BDI / BEI/BIA / BIP8 | STAT / BDI / BEI/BIA / BIP8 | 0 1 |

← OH2

| Reserved overhead | Protection switching and its communication channel | General communication channel of a multiplex section | Synchronization |
|---|---|---|---|
| RES | APS/PCC | GCC2 | 0 1 |

EFFICIENT ETHERNET SIGNAL TRANSPORT AND SCHEDULING

CROSS-REFERENCE TO RELATED APPLICATIONS

This application is a continuation of International Application No. PCT/CN2014/070593, filed Jan. 14, 2014, which is hereby incorporated by reference in its entirety.

TECHNICAL FIELD

Embodiments of the present invention relate to network technologies, and in particular, to an Ethernet signal transport method and scheduling method, and an apparatus and a system thereof.

BACKGROUND

With the rapid development of network technologies, people have increasingly high requirements for a transmission rate and transmission quality of network data. At present, for a high-speed Ethernet network, a multi-lane (MLD) structure is generally used.

In the prior art, an optical transport network is used to effectively transport an Ethernet signal. When a network device A transmits an Ethernet signal to a network device B by using an optical transport network, a wavelength division multiplexing (WDM) device or an optical transport network device is required to encapsulate the Ethernet signal into an optical channel payload unit (OPU), and then sequentially encapsulate an optical channel data unit (ODU) overhead, an optical channel transport unit (OTU) overhead, and the like.

In the prior art, a transport path is monitored by using an OTU overhead and an ODU overhead, which requires a dedicated device to encapsulate a client signal multiple times and requires additional processing such as encapsulation and mapping. As a result, a processing process of Ethernet signal transport is complicated, and costs of processing resources used in Ethernet signal transport are relatively high.

SUMMARY

Embodiments of the present invention provide an Ethernet signal transport method and scheduling method, and an apparatus and a system thereof, so as to resolve a problem in the prior art that a processing process of Ethernet signal transport is complicated and costs of processing resources used in Ethernet signal transport are relatively high.

According to a first aspect, an embodiment of the present invention provides an Ethernet signal transport method, including:

inserting, by a first network device, path monitoring information into a position that is a preset bit length away from an alignment marker AM in a physical coding sublayer lane PCSL of an Ethernet signal; and sending, by the first network device to at least one second network device, a signal bearing the PCSL into which the path monitoring information is inserted.

According to the first aspect, in a first possible implementation manner of the first aspect, the path monitoring information is carried by using an overhead bit block, where the overhead bit block includes at least one bit block.

According to the first aspect or the first possible implementation manner of the first aspect, in a second possible implementation manner of the first aspect, the path monitoring information includes a regenerator section RS overhead, where the RS overhead is used to monitor a status of signal transmission between signal regenerating terminals.

According to the second possible implementation manner of the first aspect, in a third possible implementation manner of the first aspect, the path monitoring information further includes a multiplex section MS overhead, where the MS overhead is used to monitor a status of signal transmission between two multiplexers.

According to any one of the first aspect to the third possible implementation manner of the first aspect, in a fourth possible implementation manner of the first aspect, the path monitoring information further includes additional request information, where the additional request information is used to apply to the at least one second network device for monitoring information of a corresponding type.

According to the fourth possible implementation manner of the first aspect, in a fifth possible implementation manner of the first aspect, the monitoring information applied for by using the additional request information includes any one of the following: trail trace identifier TTI information, path type fault location FTFL information, payload structure identifier PSI information, and broadband adjustment-related information.

According to any one of the first aspect to the fifth possible implementation manner of the first aspect, in a sixth possible implementation manner of the first aspect, the inserting, by a first network device, path monitoring information into a position that is a preset bit length away from an AM in a PCSL of an Ethernet signal includes:

inserting, by the first network device, the path monitoring information into a position that is the preset bit length away from each AM in the PCSL of the Ethernet signal; and performing, by the first network device, scrambling on the path monitoring information.

According to any one of the first aspect to the sixth possible implementation manner of the first aspect, in a seventh possible implementation manner of the first aspect, before the sending, by the first network device to at least one second network device, a signal bearing the PCSL into which the path monitoring information is inserted, the method further includes:

performing, by the first network device, electrical-to-optical conversion on the signal bearing the PCSL into which the path monitoring information is inserted, to generate an optical signal; and accordingly, the sending, by the first network device to at least one second network device, a signal bearing the PCSL into which the path monitoring information is inserted includes:

sending, by the first network device, the optical signal generated by means of electrical-to-optical conversion to the at least one second network device.

According to the seventh possible implementation manner of the first aspect, in an eighth possible implementation manner of the first aspect, the performing, by the first network device, electrical-to-optical conversion on the signal bearing the PCSL into which the path monitoring information is inserted, to generate an optical signal includes:

performing, by the first network device by using on-off-keying OOK modulation, polarization multiplexing phase modulation, or polarization multiplexing phase amplitude modulation, electrical-to-optical conversion on the signal bearing the PCSL into which the path monitoring information is inserted, to generate the optical signal.

According to any one of the sixth to eighth possible implementation manners of the first aspect, in a ninth possible implementation manner of the first aspect, before the performing, by the first network device, electrical-to-optical conversion on the signal bearing the PCSL into which the path monitoring information is inserted, to generate an optical signal, the method further includes:

performing, by the first network device, forward error correction FEC coding on the signal bearing the PCSL into which the path monitoring information is inserted.

According to a second aspect, an embodiment of the present invention provides an Ethernet signal scheduling method, including:

performing, by a first network device, PCSL switching on M electrical signals to generate N Ethernet signals or N client signals, where M≥1, N≥1, and M and N cannot be 1 at the same time; and sending, by the first network device, the N Ethernet signals to at least one second network device; or sending, by the first network device, the N client signals to at least one first Medium Access Control MAC processing device.

According to the second aspect, in a first possible implementation manner of the second aspect, before the performing, by a first network device, PCSL switching on M electrical signals, the method further includes:

performing, by the first network device, PCSL synchronization on the M electrical signals, so that PSCLs of the M electrical signals have a same clock frequency and AM phase.

According to the first possible implementation manner of the second aspect, in a second possible implementation manner of the second aspect, the performing, by the first network device, PCSL synchronization on the M electrical signals includes:

performing, by the first network device, PCSL synchronization by inserting or deleting an idle bit block in the M electrical signals.

According to the first or second possible implementation manner of the second aspect, in a third possible implementation manner of the second aspect, before the performing, by a first network device, PCSL switching on M electrical signals, the method further includes:

performing, by the first network device, PCSL rate adjustment on the M electrical signals, so that the PSCLs of the M electrical signals have a same nominal bit rate.

According to any one of the second aspect to the third possible implementation manner of the second aspect, in a fourth possible implementation manner of the second aspect, before the performing, by a first network device, PCSL switching on M electrical signals, the method further includes:

locking, by the first network device, AMs of the M electrical signals, so as to acquire PCSL sequence information of the M electrical signals; and accordingly, the performing, by a first network device, PCSL switching on M electrical signals includes:

performing, by the first network device, PCSL switching according to the PCSL sequence information and preset switching configuration information.

According to any one of the second aspect to the fourth possible implementation manner of the second aspect, in a fifth possible implementation manner of the second aspect, before the performing, by a first network device, PCSL switching on M electrical signals, the method further includes:

receiving, by the first network device, an optical signal sent by at least one another network device, and performing optical-to-electrical conversion on the optical signal sent by the at least one another network device, to generate the M electrical signals; or receiving, by the first network device, a client signal sent by at least one second MAC processing device, and performing bit block coding on the client signal sent by the at least one second MAC processing device, to generate the M electrical signals.

According to any one of the second aspect to the fifth possible implementation manner of the second aspect, in a sixth possible implementation manner of the second aspect, before the sending, by the first network device, the N Ethernet signals to at least one second network device, the method further includes:

performing, by the first network device, electrical-to-optical conversion on the N Ethernet signals to generate an optical signal; and accordingly, the sending, by the first network device, the N Ethernet signals to at least one second network device includes:

sending, by the first network device, the optical signal generated by means of electrical-to-optical conversion to the at least one second network device.

According to the sixth possible implementation manner of the second aspect, in a seventh possible implementation manner of the second aspect, the performing, by the first network device, electrical-to-optical conversion on the N Ethernet signals to generate an optical signal includes:

performing, by the first network device by using OOK modulation, polarization multiplexing phase modulation, or polarization multiplexing phase amplitude modulation, electrical-to-optical conversion on the N Ethernet signals, to generate the optical signal.

According to a third aspect, an embodiment of the present invention provides an Ethernet signal transport apparatus, including:

an insertion module, configured to insert path monitoring information into a position that is a preset bit length away from an AM in a PCSL of an Ethernet signal; and a sending module, configured to send, to at least one second network device, a signal bearing the PCSL into which the path monitoring information is inserted.

According to the third aspect, in a first possible implementation manner of the third aspect, the path monitoring information is carried by using an overhead bit block, where the overhead bit block includes at least one bit block.

According to the third aspect or the first possible implementation manner of the third aspect, in a second possible implementation manner of the third aspect, the path monitoring information includes a regenerator section RS overhead, where the RS overhead is used to monitor a status of signal transmission between signal regenerating terminals.

According to the second possible implementation manner of the third aspect, in a third possible implementation manner of the third aspect, the path monitoring information further includes a multiplex section MS overhead, where the MS overhead is used to monitor a status of signal transmission between two multiplexers.

According to any one of the third aspect to the third possible implementation manner of the third aspect, in a fourth possible implementation manner of the third aspect, the path monitoring information further includes additional request information, where the additional request information is used to apply to the at least one second network device for monitoring information of a corresponding type.

According to any one of the third aspect to the fourth possible implementation manner of the third aspect, in a fifth possible implementation manner of the third aspect, the monitoring information applied for by using the additional request information includes any one of the following: trail trace identifier TTI information, path type fault location FTFL information, payload structure identifier PSI information, and broadband adjustment-related information.

According to any one of the third aspect to the fifth possible implementation manner of the third aspect, in a sixth possible implementation manner of the third aspect, the insertion module is specifically configured to: insert the path monitoring information into a position that is the preset bit length away from each AM in the PCSL of the Ethernet signal, and perform scrambling on the path monitoring information.

According to the sixth possible implementation manner of the third aspect, in a seventh possible implementation manner of the third aspect, the sending module is further configured to: before the sending module sends the signal bearing the PCSL into which the path monitoring information is inserted to the at least one second network device, perform electrical-to-optical conversion on the signal bearing the PCSL into which the path monitoring information is inserted, to generate an optical signal; and send the optical signal generated by means of electrical-to-optical conversion to the at least one second network device.

According to the seventh possible implementation manner of the third aspect, in an eighth possible implementation manner of the third aspect, the sending module is further configured to: before converting the signal bearing the PCSL into which the path monitoring information is inserted, to generate the optical signal, perform FEC coding on the signal bearing the PCSL into which the path monitoring information is inserted.

According to a fourth aspect, an embodiment of the present invention further provides an Ethernet signal scheduling apparatus, including:

a switching module, configured to perform PCSL switching on M electrical signals to generate N Ethernet signals or N client signals, where M≥1, N≥1, and M and N cannot be 1 at the same time; and a sending module, configured to send the N Ethernet signals to at least one second network device; or send the N client signals to at least one first MAC processing device.

According to the fourth aspect, in a first possible implementation manner of the fourth aspect, the apparatus further includes:

an alignment module, configured to: before the switching module performs PCSL switching on the M electrical signals, perform PCSL synchronization on the M electrical signals, so that PSCLs of the M electrical signals have a same clock frequency and AM phase.

According to the first possible implementation manner of the fourth aspect, in a second possible implementation manner of the fourth aspect, the alignment module is further configured to: before the switching module performs PCSL switching on the M electrical signals, perform PCSL rate adjustment on the M electrical signals, so that the PSCLs of the M electrical signals have a same nominal bit rate.

According to any one of the fourth aspect to the second possible implementation manner of the fourth aspect, in a third possible implementation manner of the fourth aspect, the apparatus further includes:

a locking module, configured to: before the switching module performs PCSL switching on the M electrical signals, lock AMs of the M electrical signals, so as to acquire PCSL sequence information of the M electrical signals; and accordingly, the switching module is further configured to perform PCSL switching according to the PCSL sequence information and preset switching configuration information.

According to any one of the fourth aspect to the third possible implementation manner of the fourth aspect, in a fourth possible implementation manner of the fourth aspect, the apparatus further includes:

a first receiving module, configured to: before the switching module performs PCSL switching on the M electrical signals, receive an optical signal sent by at least one another network device, and perform optical-to-electrical conversion on the optical signal sent by the at least one another network device, to generate the M electrical signals; or the apparatus further includes:

a second receiving module, configured to: receive a client signal sent by at least one second MAC processing device, and perform bit block coding on the client signal sent by the at least one second MAC processing device, to generate the M electrical signals.

According to any one of the fourth aspect to the fourth possible implementation manner of the fourth aspect, in a fifth possible implementation manner of the fourth aspect, the sending module is further configured to: before the sending module sends the N Ethernet signals to the at least one second network device, perform electrical-to-optical conversion on the N Ethernet signals to generate an optical signal; and send the optical signal generated by means of electrical-to-optical conversion to the at least one second network device.

According to a fifth aspect, an embodiment of the present invention further provides an Ethernet signal transport apparatus, including a receiver, a transmitter, and a processor, where the processor is configured to insert path monitoring information into a position that is a preset bit length away from an AM in a PCSL of an Ethernet signal; and the transmitter is configured to send, to at least one second network device, a signal bearing the PCSL into which the path monitoring information is inserted.

According to the fifth aspect, in a first possible implementation manner of the fifth aspect, the path monitoring information is carried by using an overhead bit block, where the overhead bit block includes at least one bit block.

According to the fifth aspect or the first possible implementation manner of the fifth aspect, in a second possible implementation manner of the fifth aspect, the path monitoring information includes a regenerator section RS overhead, where the RS overhead is used to monitor a status of signal transmission between signal regenerating terminals.

According to the second possible implementation manner of the fifth aspect, in a third possible implementation manner of the fifth aspect, the path monitoring information further includes a multiplex section MS overhead, where the MS overhead is used to monitor a status of signal transmission between two multiplexers.

According to any one of the fifth aspect to the third possible implementation manner of the fifth aspect, in a fourth possible implementation manner of the fifth aspect, the path monitoring information further includes additional request information, where the additional request information is used to apply to the at least one second network device for monitoring information of a corresponding type.

According to the fourth possible implementation manner of the fifth aspect, in a fifth possible implementation manner of the fifth aspect, the monitoring information applied for by using the additional request information includes any one of the following: trail trace identifier TTI information, path type fault location FTFL information, payload structure identifier PSI information, and broadband adjustment-related information.

According to any one of the fifth aspect to the fifth possible implementation manner of the fifth aspect, in a sixth possible implementation manner of the fifth aspect, the processor is configured to: insert the path monitoring information into a position that is the preset bit length away from each AM in the PCSL of the Ethernet signal, and perform scrambling on the path monitoring information.

According to the sixth possible implementation manner of the fifth aspect, in a seventh possible implementation manner of the fifth aspect, the transmitter is further configured to: before the transmitter sends the signal bearing the PCSL into which the path monitoring information is inserted to the at least one second network device, perform electrical-to-optical conversion on the signal bearing the PCSL into which the path monitoring information is inserted, to generate an optical signal; and send the optical signal generated by means of electrical-to-optical conversion to the at least one second network device.

According to the seventh possible implementation manner of the fifth aspect, in an eighth possible implementation manner of the fifth aspect, the transmitter is further configured to: before performing electrical-to-optical conversion on the signal bearing the PCSL into which the path monitoring information is inserted, to generate the optical signal, perform FEC coding on the signal bearing the PCSL into which the path monitoring information is inserted.

According to a sixth aspect, an embodiment of the present invention further provides an Ethernet signal scheduling apparatus, including a receiver, a transmitter, and a processor, where the processor is configured to perform PCSL switching on M electrical signals to generate N Ethernet signals or N client signals, where M≥1, N≥1, and M and N cannot be 1 at the same time; and the transmitter is configured to send the N Ethernet signals to at least one second network device; or send the N client signals to at least one first MAC processing device.

According to the sixth aspect, in a first possible implementation manner of the sixth aspect, the processor is further configured to: before performing PCSL switching on the M electrical signals, perform PCSL synchronization on the M electrical signals, so that PSCLs of the M electrical signals have a same clock frequency and AM phase.

According to the first possible implementation manner of the sixth aspect, in a second possible implementation manner of the sixth aspect, the processor is further configured to perform PCSL synchronization by inserting or deleting an idle bit block in the M electrical signals.

According to the first or second possible implementation manner of the sixth aspect, in a third possible implementation manner of the sixth aspect, the processor is further configured to: before performing PCSL switching on the M electrical signals, perform PCSL rate adjustment on the M electrical signals, so that the PSCLs of the M electrical signals have a same nominal bit rate.

According to any one of the sixth aspect to the third possible implementation manner of the sixth aspect, in a fourth possible implementation manner of the sixth aspect, the processor is further configured to: before performing PCSL switching on the M electrical signals, lock AMs of the M electrical signals, so as to acquire PCSL sequence information of the M electrical signals; and perform PCSL switching according to the PCSL sequence information and switching configuration information.

According to any one of the sixth aspect to the fourth possible implementation manner of the sixth aspect, in a fifth possible implementation manner of the sixth aspect, the receiver is configured to: before PCSL switching is performed on the M electrical signals, receive an optical signal sent by at least one another network device, and perform optical-to-electrical conversion on the optical signal sent by the at least one another network device, to generate the M electrical signals; or the receiver is configured to: receive a client signal sent by at least one second MAC processing device, and perform bit block coding on the client signal sent by the at least one second MAC processing device, to generate the M electrical signals.

According to the sixth aspect to the fifth possible implementation manner of the sixth aspect, in a sixth possible implementation manner of the sixth aspect, the transmitter is further configured to: before the transmitter sends the N Ethernet signals to the at least one second network device, perform electrical-to-optical conversion on the N Ethernet signals to generate an optical signal; and send the optical signal generated by means of electrical-to-optical conversion to the at least one second network device.

According to a seventh aspect, an embodiment of the present invention further provides a network system, including at least the Ethernet signal transport apparatus described in any one possible implementation manner of the foregoing third aspect or the Ethernet signal transport apparatus described in any one possible implementation manner of the foregoing fifth aspect.

According to an eighth aspect, an embodiment of the present invention further provides a network system, including at least the Ethernet signal scheduling apparatus described in any one possible implementation manner of the foregoing fourth aspect or the Ethernet signal scheduling apparatus described in any one possible implementation manner of the foregoing sixth aspect.

According to a ninth aspect, an embodiment of the present invention further provides a network system, including at least the Ethernet signal transport apparatus described in any one possible implementation manner of the third aspect and the Ethernet signal scheduling apparatus described in any one possible implementation manner of the fifth aspect; or the Ethernet signal transport apparatus described in any one possible implementation manner of the fourth aspect and the Ethernet signal scheduling apparatus described in any one possible implementation manner of the sixth aspect.

According to the Ethernet signal transport method and scheduling method, and the apparatus and system thereof provided in the embodiments of the present invention, a first network device inserts path monitoring information into a PCSL of an Ethernet signal, or directly performs PCSL switching, which reduces multiple times of encapsulation and decapsulation of the Ethernet signal, and corresponding processing, thereby reducing processing resource costs of Ethernet signal transport, and avoiding waste of processing resources.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 3 is a schematic structural diagram of carrying path monitoring information by using an overhead bit block according to Embodiment 2 of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

As users have an increasingly high requirement for network traffic, Ethernet technologies, adopted by the users, of corresponding rates are also continuously developing, which are gradually developed from 10M/100M/1000M/10G to higher-rate Ethernet technologies, 40G/100G Ethernet technologies. Ethernet signal processing is mainly classified into data link layer processing and physical layer processing. It should be noted that solutions involved in the embodiments of the present invention are explained and described mainly with respect to physical layer processing of an Ethernet signal.

Embodiment 1

Figure 1:
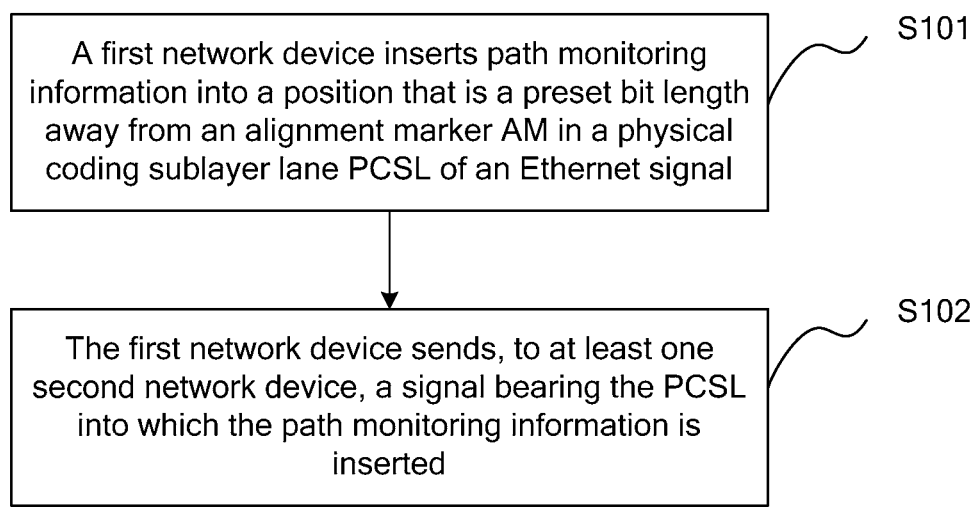
FIG. 1 is a flowchart of an Ethernet signal transport method according to Embodiment 1 of the present invention.

FIG. 1 is a flowchart of an Ethernet signal transport method according to Embodiment 1 of the present invention. The method in this embodiment is applicable to a case in which an Ethernet signal is transported from one network device to one or more network devices. The method is executed by a first network device, where the apparatus is generally implemented by means of hardware and/or software. As shown in FIG. 1, the method in this embodiment includes the following steps:

Step 101. A first network device inserts path monitoring information into a position that is a preset bit length away from an alignment marker AM in a physical coding sublayer lane PCSL of an Ethernet signal.

Step 102. The first network device sends, to at least one second network device, a signal bearing the PCSL into which the path monitoring information is inserted.

An Ethernet signal of an MLD structure includes multiple physical coding sublayer lanes (PCSL). For example, a 40G Ethernet signal has 4 PCSLs (0 to 3), and a 100G Ethernet signal has 20 PCSLs (0 to 19). Information about each PCSL includes a service data block, a control block, and an alignment marker (AM) that are borne by the PCSL. The AM is an identifier inserted into each PCSL after block distribution is performed at a physical coding sublayer (PCS), where the identifier is used to mark a sequence number of the PCSL.

In the MLD structure, each PCSL of an Ethernet signal bears, in a form of a bit block, corresponding information such as service data and control information. A quantity of bits in a bit block in each PCSL may be a fixed quantity of bits, for example, 66 bit. A bit quantity and structure of an AM available in a PCSL of an Ethernet signal may keep consistent with those of another bit block in the PCSL of the Ethernet signal, where the bit quantity may also be 66 bit. A sequence number of the PCSL in which the AM is located is carried by using the 66-bit information. Each PCSL includes at least one AM. When the PCSL includes more than two AMs, different AMs identify a same PCSL sequence number, and any two adjacent AMs of the different AMs are spaced by a fixed quantity of bits or a fixed quantity of bit blocks, for example, may be spaced by 16383 66-bit bit blocks.

The 66-bit bit block includes a 64-bit information bit and a 2-bit synchronization header (Sync Header) bit. The 66-bit bit block carries data information or a control packet by using the 64-bit information bit, and identifies, by using the 2-bit synchronization header bit, whether the current bit block is a data bit block or a control bit block. For example, it may be that a synchronization header 10 indicates that the bit block is a control bit block; accordingly, a synchronization header 01 indicates that the bit block is a data bit block.

The path monitoring information may contain multi-level multi-type path monitoring information. Inserting path monitoring information into an Ethernet signal may be: bearing the path monitoring information in multiple bit blocks, and evenly distributing these bit blocks bearing the path monitoring information between any two AMs of the Ethernet signal. For example, it is assumed that the path monitoring information is borne in seven 66-bit bit blocks. In an Ethernet signal, any two AMs are spaced by a fixed quantity of bits. For example, any two adjacent AMs are spaced by 16383 66-bit bit blocks. Therefore, a preset bit length between a bit block of the 7 bit blocks bearing the path monitoring information and an adjacent AM may be 2047 bit blocks, and any two adjacent bit blocks bearing the path monitoring information are spaced by 2047 bit blocks. Therefore, in step 101, the preset bit length away from the AM may also be a preset bit block length. Certainly, the insertion may not be performed according to a bit block, and may be performed according to a preset bit length.

An Ethernet signal includes multiple PCSLs, and each PCSL includes an AM used to mark a corresponding sequence number of the PCSL. Therefore, the sending, by the first network device to at least one second network device, a signal bearing the PCSL into which the path monitoring information is inserted may be: sending, according to a sequence number carried by the AM in the signal of the PCSL into which the path monitoring information is inserted and according to a preset configuration, the signal bearing the PCSL into which the path monitoring information is inserted to the at least one second network device at a granularity of a PCSL. The first network device and the second network device are located on different signal transport nodes, and may be routers or switches.

The sending, according to a preset configuration, the signal bearing the PCSL into which the path monitoring information is inserted to the at least one second network device at a granularity of a PCSL contains at least two application scenarios.

A first application scenario is an application scenario in which one Ethernet signal corresponds to one Ethernet link. This is also a mainstream application scenario of a current Ethernet network. In this scenario, step 101 in the solution of the foregoing embodiment specifically includes:

selecting, by the first network device, one PCSL in the Ethernet signal according to a preset configuration; and inserting the path monitoring information into a position that is the preset bit length away from an AM in the PCSL.

Accordingly, the signal bearing the PCSL into which the path monitoring information is inserted is the Ethernet signal bearing the PCSL into which the path monitoring information is inserted. Step 102 specifically includes:

sending, by the first network device, the Ethernet signal bearing the PCSL into which the path monitoring information is inserted to one second network device.

A second application scenario is an application scenario in which one Ethernet signal corresponds to at least two Ethernet links. This application scenario is applicable to transport in a flexible Ethernet (FlexEth). The FlexEth mainly means that one Ethernet port may be configured as multiple virtual Ethernet ports, so as to split one Ethernet link into multiple Ethernet links (also referred to as sub Ethernet links in the following) by using the configured multiple virtual Ethernet ports. These sub Ethernet links may be connected to different routers or switches. In this way, one FlexEth signal may correspond to at least two Ethernet links. In this application scenario, step 101 in the solution of the foregoing embodiment specifically includes:

selecting, by the first network device, at least two PCSLs in the Ethernet signal according to a preset configuration; and inserting the path monitoring information into a position that is the preset bit length away from an AM in each PCSL of the at least two PCSLs.

The at least two PCSLs need to cover all Ethernet links. That is, at least one PCSL needs to be selected for each Ethernet link for inserting the path monitoring information. For example, one PCSL may be selected for each Ethernet link for inserting the path monitoring information. A transport status of each Ethernet link is monitored by using the path monitoring information inserted into the selected PCSL.

Accordingly, step 102 in the solution of the foregoing embodiment may specifically include:

sending respectively, by the first network device, signals bearing the at least two PCSLs into which the path monitoring information is inserted to at least two second network devices according to preset attribution configurations of Ethernet links corresponding to the at least two PCSLs. For example, the signal sent to any one network device of the at least two second network devices may be a signal bearing a part of PCSLs in the Ethernet signal in step 101 (in at least one PCSL in each part of PCSLs, the path monitoring information is inserted into a position that is the preset bit length away from an AM).

In this embodiment, a first network device directly inserts path monitoring information into a PCSL of an Ethernet signal, which reduces multiple times of encapsulation and decapsulation of the Ethernet signal, and corresponding processing, thereby reducing processing resource costs of Ethernet signal transport, and avoiding waste of processing resources.

In addition, in the solution of this embodiment, no WDM device or optical transport device is required, and no maintenance management is required for the WDM device or the optical transport device, thereby reducing architecture costs of a current network system.

Embodiment 2

On a basis of the foregoing solution, this embodiment of the present invention further provides an Ethernet signal transport method.

The path monitoring information is carried by using an overhead bit block, where the overhead bit block includes at least one bit block.

Specifically, the carrying the path monitoring information by using an overhead (OH) bit block may be carrying the path monitoring information by using information bits of the overhead bit block. A bit quantity and structure of the OH bit block may keep consistent with those of another bit block such as a data bit block and a control bit block in the Ethernet signal. That is, the OH bit block may also be 66 bit, including a 64-bit overhead information bit and a 2it synchronization header bit. The 64-bit overhead information bit may be 8 octets, Octet0 to Octet7.

The path monitoring information includes a regenerator section RS overhead, where the RS overhead is used to monitor a status of signal transmission between signal regenerating terminals.

In this embodiment, the carrying the path monitoring information by using an OH bit block may be carrying overhead information having a relatively strict requirement for transmission time by using the OH bit block. Specifically, the overhead information having a relatively strict for transmission time may be regenerator section (RS) overhead information. The signal generating terminal refers to a terminal that can perform electro-regeneration or electric processing on a signal. For example, the first network device inserts path monitoring information into a position that is a preset bit length away from an AM in a PCSL of an Ethernet signal. In general, information can be inserted only by means of electric processing. Therefore, the first network device needs to perform electric processing on a signal, and belongs to a signal regenerating terminal. The first network device sends, to at least one second network device, a signal bearing the PCSL into which the path monitoring information is inserted. If the at least one second network device needs to perform electro-regeneration or electric processing on the signal bearing the PCSL into which the path monitoring information is inserted, the at least one second network device also belongs to a signal regenerating terminal. In this case, what is monitored by the RS overhead is a status of signal transmission between the first network device and the at least one second network device, including signal transmission statuses of the first network device and the at least one second network device. If the at least one second network device does not perform electro-regeneration or electric processing on the signal bearing the PCSL into which the path monitoring information is inserted, but only transmits the signal bearing the PCSL into which the path monitoring information is inserted to at least one third network device, for example, only directly sends, at an optical layer, the signal bearing the PCSL into which the path monitoring information is inserted to the at least one third network device, the at least one third network device performs electro-regeneration or electric processing on the signal bearing the PCSL into which the path monitoring information is inserted. In this case, what is monitored by the RS overhead is a status of signal transmission between the first network device and the at least one third network device, certainly including signal transmission statuses of the first network device and the at least one third network device.

The RS overhead information may include reserved overhead information of an RS, general communication channel (General Communication Channel0, GCC0 for short) information of the RS, and section monitoring information of the RS. The section monitoring information of the RS includes: backward defect indication (BDI) information, incoming alignment error (IAE) information, backward error indication (BEI) information, or backward incoming alignment error (BIAE) information.

Further, the path monitoring information in the foregoing solution further includes a multiplex section MS overhead, where the MS overhead is used to monitor a status of signal transmission between two multiplexers.

Specifically, the foregoing overhead information having a relatively strict for transmission time further includes multiplex section (MS) overhead information. The multiplexer refers to a terminal that multiplexes different transmitted signals on one link for transmission or demultiplexes a signal from a same link as multiple signals, for example, sends signal to multiple processing modules by using multiple links. For example, an Ethernet signal received by the first network device is signals sent by multiple network devices, the signals sent by the multiple network devices are multiplexed on one link and are transmitted to at least one second network device, and a signal received by the second network device is demultiplexed as multiple signals. In this case, both the first network device and the at least one second network device are multiplexers. What is monitored by the MS overhead is a status of signal transmission between the first network device and the at least one second network device, and signal transmission statuses of the first network device and the at least one second network device.

The MS overhead information may include monitoring information of an MS and at least one piece of GCC information of the MS, for example, GCC1 and GCC2 information. The monitoring information of the MS includes: status field (STAT) information, BDI information, BEI information, and bit interleaved parity (BIP) information.

The path monitoring information in the foregoing solution further includes additional request information, where the additional request information is used to apply to the at least one second network device for monitoring information of a corresponding type.

The monitoring information applied for by using the additional request information includes any one of the following: trail trace identifier TTI information, path type fault location FTFL information, payload structure identifier PSI information, and broadband adjustment-related information.

Specifically, in the foregoing solution, overhead information having a relatively strict requirement for time is carried by using the OH bit block, and overhead information having a relatively loose requirement for time may be applied for from a second network device by using the additional request information. The monitoring information applied for by using the additional request message includes: trail trace identifier (TTI) information, path type fault location (FTFL) information, payload structure identifier (PSI) information, and broadband adjustment-related information. The additional request message includes a type (TYP). Corresponding information may be applied for from the second network device according to different request information indicated by different configurations of the TYP. The TTI information includes regenerator section TTI information, multiplex section TTI information, and tandem connection monitoring (TCM) TTI information. The TYP may be 5 bit, corresponding to 32 different monitoring information request messages.

For example, if the TYP is expressed by a binary-coded 00001, that is, a hexadecimally-coded 01, monitoring information currently requested by using the additional request message is regenerator section TTI information; if the TYP is expressed by a binary-coded 00010, that is, a hexadecimally-coded 02, monitoring information currently requested by using the additional request message is multiplex section TTI information; if the TYP is expressed by a binary-coded 00011, that is, a hexadecimally-coded 03, monitoring information currently requested by using the additional request message is tandem connection monitoring (TCM) TTI information; if the TYP is expressed by a binary-coded 00100, that is, a hexadecimally-coded 04, monitoring information currently requested by using the additional request message is FTFL information; if the TYP is expressed by a binary-coded 00101, that is, a hexadecimally-coded 05, monitoring information currently requested by using the additional request message is PSI information; if the TYP is expressed by a binary-coded 00110, that is, a hexadecimally-coded 06, monitoring information currently requested by using the additional request message is broadband adjustment-related information.

In addition to the foregoing information, the path monitoring information further includes: information about three TCMs, namely TCM1 to TCM3, automatic protection switching (APS), protection communication (PCC) channel information, and the like. The information may be included in the RS overhead information.

In the foregoing solution, the carrying the path monitoring information by using an OH bit block may be: using 3 bit blocks OH1 to OH3 to carry the path monitoring information having a strict requirement for time; and carrying the additional request information in the 3 bit blocks to transfer the path monitoring information having a relatively loose requirement for time.

Figure 2:
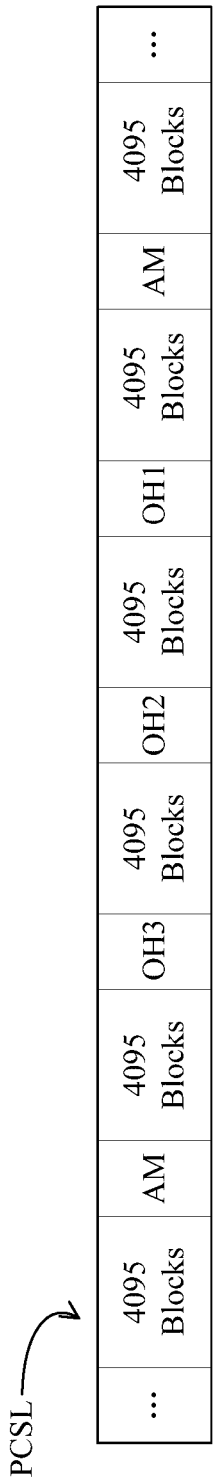
FIG. 2 is a schematic structural diagram of an Ethernet signal into which path monitoring information is inserted according to Embodiment 2 of the present invention.

FIG. 2 is a schematic structural diagram of an Ethernet signal into which path monitoring information is inserted according to Embodiment 2 of the present invention.

Inserting path monitoring information into a PCSL of an Ethernet signal is actually inserting the path monitoring information into any two adjacent AMs in the PCSL of the Ethernet signal averagely. In order to ensure that the Ethernet signal after the path monitoring information is inserted still conforms to a current network technology standard, for example, any two AMs in a PCSL of an Ethernet signal are spaced by a fixed quantity of bits, that is, 16383 bit blocks, it is determined, according to path monitoring information to be inserted, that is, path monitoring information having a strict requirement for time, that 3 OH bit blocks need to be inserted. If 3 OH bit blocks are inserted, adjacent OH bit blocks carrying the path monitoring information are spaced by 4095 bit blocks, and an OH bit block and an adjacent AM are also spaced by 4095 bit blocks. As shown in FIG. 2, there are 4095 bit blocks spaced between OH1 and OH1, and between OH2 and OH3, and there are 4095 bit blocks spaced between OH1 and an adjacent AM, and between OH3 and an adjacent AM. In addition, for path monitoring information having a relatively loose requirement for time, one field is selected from OH1 to OH3 to carry additional request information, where the field may be located in any one or more overhead blocks of OH1 to OH3. Monitoring information of a corresponding type, which is applied for by using the additional request information, is generally sent by the at least one second network device (in some cases, when the first network device and the at least one second network device need to make a handshake for confirmation, the first network device also sends some monitoring information of the corresponding type which is applied for by using the additional request information). Therefore, the monitoring information may be carried by using a reserved field in OH1 to OH3 of an Ethernet signal that is sent to the first network device by the at least one second network device, or may be carried by using a control block of the Ethernet signal.

FIG. 3 is a schematic structural diagram of carrying path monitoring information by using an overhead bit block according to Embodiment 2 of the present invention.

As shown in FIG. 3, it may be that information bits, namely 8 octets, of OH1 are used to carry monitoring information of a regenerator section, general communication channel information GCC0 of the regenerator section, reserved overhead information of the regenerator section, monitoring information of a multiplex section, and TCM3 information; that information bits of OH2 are used to carry TCM2 information, TCM1 information, latency test information, an additional request message, and a general communication channel GCC1 of the multiplex section; and that information bits of OH3 are used to carry a general communication channel GCC2 of the multiplex section, protection switching and its communication channel, and reserved overhead information.

In this embodiment, some monitoring information having a relatively loose requirement for time may be transferred in the following manner (as shown in FIG. 3): A first network device sends a request message to a second network device by using additional request information; and after receiving the first PCSL of an Ethernet signal containing the additional request information, the second network device returns monitoring information of a corresponding type to the first network device, so that the first network device inserts the returned monitoring information into an OH overhead bit block of a subsequent PCSL of the Ethernet signal or into a control bit block of a subsequent PCSL of the Ethernet signal.

If the returned monitoring information is inserted into the OH overhead bit block of the subsequent PCSL of the Ethernet signal, the returned monitoring information may be inserted into a regenerator section reserved overhead of OH1 and a reserved overhead of OH3 shown in FIG. 3.

An example in which TTI information of a regenerator section is carried is used. A regenerator section reserved overhead of OH1 and a reserved overhead of OH3 are used to carry corresponding monitoring information. In an AM frame in an ACK position of an additional request message shown in FIG. 3, a multi-frame alignment signal (MFAS) signal is carried in the regenerator section reserved overhead of OH1, and one byte is selected from the reserved overhead of OH3 to carry the TTI information of the regenerator section.

If the returned monitoring information is inserted into the control bit block of the subsequent PCSL of the Ethernet signal, the returned monitoring information may be inserted into a control block nearest to an OH bit block where the additional request information is located, for example, OH2. As shown in FIG. 2, the control block nearest to OH2 may be a control bit block in 4095 bit clocks between OH3 and OH2, where the 4095 bit blocks include a data bit block and a control bit block. The control bit block in the 4095 bit blocks between OH3 and OH2 needs to be used to carry the returned monitoring information. The control bit block has a given type value, for example, 0x25. The type value is different from a corresponding type value of an existing control bit block carrying control information, setting signaling, or the like corresponding to a data bit block. The control bit block has a different structure. The control bit block includes: a type of the control bit block, a type TYP of the monitoring information, a transfer status, sequence information, and monitoring information content. The type of the control bit block may be a type value, for example, 0x25. For the TTI information of the regenerator section, the type TYP of the monitoring information may be expressed by a binary-coded 00001. The transfer status indicates whether a current control bit block is the last bit block carrying the returned monitoring information. The sequence information refers to information about a location or sequence of the control bit block in all bit blocks carrying the returned monitoring information. Specific monitoring information may be placed in the monitoring information content.

Alternatively, in this embodiment, the carrying the path monitoring information by using an OH bit block may also be: carrying, by using the OH bit block, all path overhead information required to transfer the Ethernet signal, including overhead information carried by an OTU overhead, an ODU overhead, an OPU overhead, and the like. The overhead information carried by the OTU overhead, the ODU overhead, the OPU overhead, and the like is used as an example. All overhead information in this example includes frame alignment overhead information, OTU overhead information, ODU overhead information, and OPU overhead information, a total of 56 octets. The frame alignment overhead information includes multi-frame alignment signal (MFAS) information. Existing frame alignment overhead information further includes a frame alignment signal (FAS). However, in this embodiment, the FAS information is carried by using an AM. The OTU overhead information includes section monitoring (SM) information, GCC0 information, and reserved (RES) information. The ODU overhead information includes RES information, tandem connection monitoring active (TCM ACT) information, TCM information, path monitoring (PM) information, fault type and fault location (FTFL) information, GCC1 information, GCC2 information, and the like. The OPU overhead information includes a payload structure identifier PSI (PSI)

message and RES information. For specific definitions of the foregoing information, reference may be made to ITU-T G709.

Figure 4:
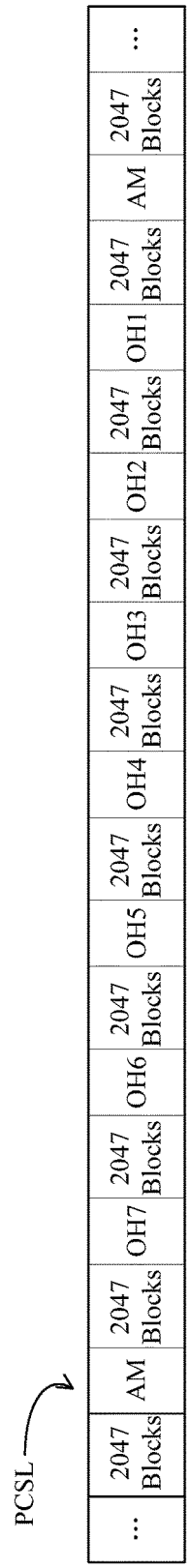
FIG. 4 is a schematic structural diagram of another Ethernet signal into which path monitoring information is inserted according to Embodiment 2 of the present invention.

FIG. 4 is a schematic structural diagram of another Ethernet signal into which path monitoring information is inserted according to Embodiment 2 of the present invention.

In this embodiment, all path overhead information of the Ethernet signal is carried by using an OH bit block. According to path monitoring information to be inserted, that is, all path monitoring information, it is determined that 7 OH bit blocks need to be inserted. If 7 OH bit blocks are inserted, adjacent OH bit blocks carrying the path monitoring information are spaced by 2047 bit blocks, and an OH bit block and an adjacent AM are also spaced by 2047 bit blocks. As shown in FIG. 4, any two adjacent OH bit blocks of OH1 to OH7 are spaced by 2047 bit blocks, and there are also 2047 bit blocks spaced between OH1 and an adjacent AM, and between OH7 and an adjacent AM.

On a basis of the foregoing solution, in the solution of this embodiment, multiple schemes of inserting path monitoring information are provided, and the inserted path monitoring information includes information about multiple different formats, which can better ensure reliable transport of an Ethernet signal after the path monitoring information is inserted.

Embodiment 3

Figure 5:
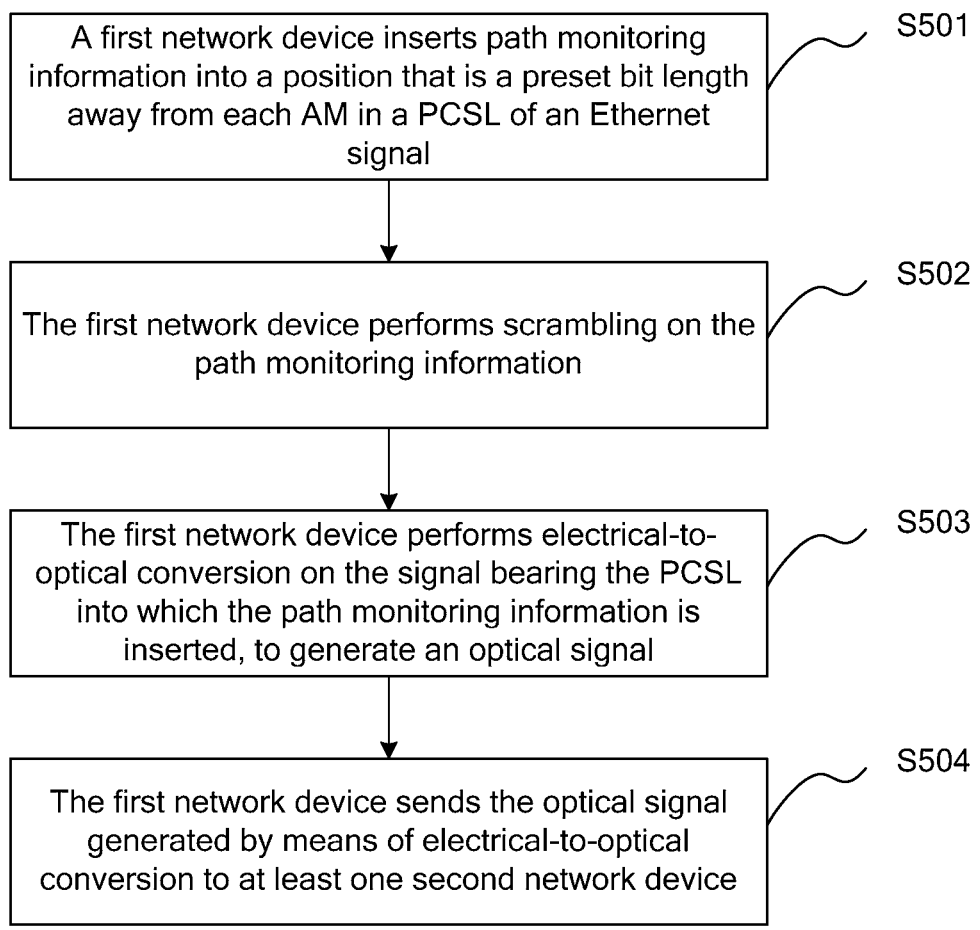
FIG. 5 is a flowchart of an Ethernet signal transport method according to Embodiment 3 of the present invention.

This embodiment of the present invention further provides an Ethernet signal transport method. FIG. 5 is a flowchart of an Ethernet signal transport method according to Embodiment 3 of the present invention. As shown in FIG. 5, the inserting, by a first network device, path monitoring information into a position that is a preset bit length away from an AM in a PCSL of an Ethernet signal in step 101 of the foregoing solution, specifically includes:

Step 501. The first network device inserts the path monitoring information into a position that is the preset bit length away from each AM in the PCSL of the Ethernet signal.

The Ethernet signal has different PCSLs according to different transmission rates of the Ethernet signal, where each PCSL includes multiple AMs. It should be noted that any two adjacent AMs are spaced by a fixed quantity of bits, for example, 16383 bit blocks, regardless of a quantity of AMs in the PCSL of the Ethernet signal. The inserting the path information into a position that is the preset bit length away from each AM refers to inserting the path monitoring information between any two adjacent AMs, which better ensures reliability of the path monitoring information.

Step 502. The first network device performs scrambling on the path monitoring information.

Performing scrambling on the inserted path monitoring information improves an anti-interference capability of the path monitoring information, thereby ensuring accuracy of the path monitoring information.

Further, before the sending, by the first network device to at least one second network device, a signal bearing the PCSL into which the path monitoring information is inserted in step 102 of the foregoing solution, the method further includes:

Step 503. The first network device performs electrical-to-optical conversion on the signal bearing the PCSL into which the path monitoring information is inserted, to generate an optical signal.

Accordingly, the sending, by the first network device to at least one second network device, a signal bearing the PCSL into which the path monitoring information is inserted in step 102 specifically includes:

Step 504. The first network device sends the optical signal generated by means of electrical-to-optical conversion to the at least one second network device.

In the foregoing solution, the performing, by the first network device, electrical-to-optical conversion on the signal bearing the PCSL into which the path monitoring information is inserted, to generate an optical signal in step 503 specifically includes:

performing, by the first network device by using on-off-keying OOK modulation, polarization multiplexing phase modulation, or polarization multiplexing phase amplitude modulation, electrical-to-optical conversion on the signal bearing the PCSL into which the path monitoring information is inserted, to generate the optical signal.

For example, if the first network device is relatively close to the at least one second network device, OOK modulation may be used to perform electrical-to-optical conversion on the signal bearing the PCSL into which the path monitoring information is inserted, to generate a short-distance optical signal; accordingly, if the first network device is relatively far away from the second network device, polarization multiplexing phase modulation or polarization multiplexing phase amplitude modulation may be used to perform electrical-to-optical conversion on the signal bearing the PCSL into which the path monitoring information is inserted, to generate a long-distance optical signal.

In the foregoing solution, before the performing, by the first network device, electrical-to-optical conversion on the signal bearing the PCSL into which the path monitoring information is inserted, to generate an optical signal, the method further includes:

performing, by the first network device, forward error correction FEC coding on the signal bearing the PCSL into which the path monitoring information is inserted.

Specifically, in order to ensure reception accuracy of the optical signal, before conversion, FEC coding may be performed on the signal bearing the PCSL into which the path monitoring information is inserted, so that FEC check is performed during reception, to improve the reception accuracy.

The solution in this embodiment can ensure reliable transport of the signal bearing the PCSL into which the path monitoring information is inserted.

Embodiment 4

Figure 6:
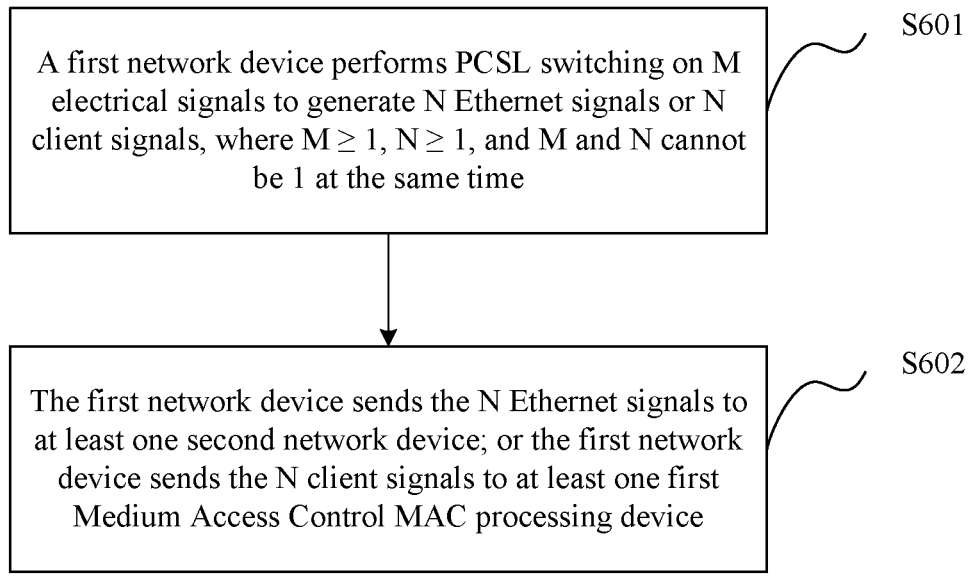
FIG. 6 is a flowchart of an Ethernet signal scheduling method according to Embodiment 4 of the present invention.

This embodiment further provides an Ethernet signal scheduling method. FIG. 6 is a flowchart of an Ethernet signal scheduling method according to Embodiment 4 of the present invention. As shown in FIG. 6, the method specifically includes:

Step 601. A first network device performs PCSL switching on M electrical signals to generate N Ethernet signals or N client signals, where $M \geq 1$, $N \geq 1$, and M and N cannot be 1 at the same time.

Step 602. The first network device sends the N Ethernet signals to at least one second network device; or the first network device sends the N client signals to at least one first Medium Access Control MAC processing device.

It should be noted that the solution in this embodiment is mainly for an Ethernet signal of an MLD structure, especially for a FlexEth signal. For a FlexEth signal, because one Ethernet physical port may be configured as multiple logical Ethernet ports, the multiple logical Ethernet ports may be used to send an Ethernet signal or a FlexEth signal to at least one network device, or receive an Ethernet signal or a FlexEth signal that is sent by at least one network device. For FlexEth signal transmission, because multiple logical Ethernet ports need to be configured to send or receive an Ethernet signal or a FlexEth signal, the FlexEth signal needs to be effectively scheduled, so as to improve utilization efficiency of network resources. Apparently, in this embodiment, not only scheduling of a FlexEth signal is supported, but also hybrid scheduling of FlexEth and Ethernet signals, and even scheduling of an Ethernet signal are supported. Apparently, a FlexEth may also be regarded as an Ethernet signal. For distinguishing, an Ethernet signal and a FlexEth signal may be collectively called a generalized Ethernet signal. In the foregoing step 601, the N Ethernet signals are N generalized Ethernet signals, which may be N Ethernet signals or FlexEth signals, including any combination of Ethernet signals and FlexEth signals. For ease of description, in the description of the present invention, the foregoing generalized Ethernet is also referred to as an Ethernet, including but not limited to the summary, description of embodiments, accompanying drawings, brief description of accompanying drawings, and claims of the present invention. That is, unless otherwise noted, the Ethernet in the summary, description of embodiments, accompanying drawings, brief description of accompanying drawings, and claims in the description of the present invention refers to a generalized Ethernet, that is, may be a traditional Ethernet, a FlexEth, or any combination of a traditional Ethernet and a FlexEth.

There are many application scenarios in which an Ethernet signal or a FlexEth signal is scheduled. The application scenarios may be simply classified into two types: one type is that an Ethernet signal or a FlexEth signal is input and output; and the other type is that an Ethernet signal or a FlexEth signal is input, and a client signal is output, for example, a client signal connected to a MAC processing device or module, or conversely, a client signal is input, and an Ethernet signal or a FlexEth signal is output.

Therefore, the M electrical signals in step 601 may also be any combination of Ethernet electrical signals, FlexEth electrical signals, and client signals.

Performing scheduling on the M electrical signals is also performing PCSL switching on the M electrical signals. When PCSL switching is performed, it is allowed that no complete PCSL signal is formed before PCSL switching, for example, no AM is inserted. In general, PCSL switching may be classified into three cases: A first case is that an Ethernet signal or a FlexEth signal is input and output. In this case, the M electrical signals contain complete PCSL signals. Therefore, AM locking may be performed first, PCSL switching is then performed on the PCSL signals, and then AM update is performed after switching, where the PCSL signal on which switching is performed may also contain no AM. A second case is that an Ethernet signal or a FlexEth signal is input, and a client signal is output. In this case, PCSL switching is similar to that in the first case, except that AM update is not required after PCSL switching. A third case is that a client signal is input, and an Ethernet signal or a FlexEth signal is output. In this case, AM locking is not required before PCSL switching, and an AM is inserted after PCSL switching.

As described above, when an Ethernet signal or a FlexEth signal is output, PCSL switching is performed on the M electrical signals to generate the N Ethernet signals; if a client signal is output, PCSL switching is performed on the M electrical signals to generate the N client signals, and the N client signals are sent to the at least one first Medium Access Control (MAC) processing device. The N client signals may be sent to the at least one first MAC processing device by using an interface between network devices or modules, for example, a 40G media independent interface (XLGMII) or a 100G media independent interface (CGMII). The first MAC processing device herein may include an independent functional module or functional apparatus, for example, any one of an independent chip, a module inside a chip, an independent processing board, and an independent processing device.

According to the solution in this embodiment, signal scheduling is implemented by means of performing PCSL switching, and a scheduled signal is sent to a corresponding network device or MAC processing device, so that an Ethernet signal can be effectively scheduled.

In the prior art, scheduling of an Ethernet signal is implemented by using an ODU switching module. The ODU switching module is generally integrated into a WDM device or an optical transport device, and the scheduling is executed by the WDM device or optical transport device. Therefore, the Ethernet signal scheduling method provided in this embodiment does not need to be executed by an additional device, and a network system adopting the Ethernet signal scheduling method described in this embodiment is simple, which can reduce architecture costs of the network system.

Further, before the performing, by a first network device, PCSL switching on M electrical signals in step 601 of the foregoing solution, the method further includes:

performing, by the first network device, PCSL synchronization on the M electrical signals, so that PSCLs of the M electrical signals have a same clock frequency and AM phase.

The M electrical signals may pass through different paths before being transported to the first network device. Therefore, different transmission latencies are generated, so that phases of the M electrical signals received by the first network device may be different due to different PCSLs. In addition, the M electrical signals may be from different network devices. These different network devices may belong to different clock domains, and therefore clock frequencies of the M electrical signals may be different. Therefore, in order to conveniently perform PCSL switching, PCSL synchronization is performed on the M electrical signals before PCSL switching is performed on the M electrical signals, so that PSCLs of the M electrical signals have a same clock frequency and AM phase. The performing PCSL synchronization on the M electrical signals may be: using a clock frequency and an AM of a PCSL in the M electrical signals as a reference, and adjusting a clock frequency and an AM of another PCSL to a same configuration.

Further, in the foregoing solution, the performing, by the first network device, PCSL synchronization on the M electrical signals specifically includes:

performing, by the first network device, PCSL synchronization by inserting or deleting an idle bit block in the M electrical signals.

Specifically, the M electrical signals may have PCSLs with different clock frequencies. A frequency difference may exist between the different clock frequencies and a clock generated by a clock generating module of the first network device. Therefore, clock compensation may be performed on these different clock frequencies, and then PCSL synchronization is performed on the M electrical signals. The clock compensation may be specifically: adjusting all PCSLs in the M electrical signals to a uniform clock frequency by inserting an idle bit block or deleting an idle bit block.

Further, before the performing, by a first network device, PCSL switching on M electrical signals in step 601 of the foregoing solution, the method further includes:

performing, by the first network device, PCSL rate adjustment on the M electrical signals, so that the PSCLs of the M electrical signals have a same nominal bit rate.

The performing rate adjustment on the M electrical signals may be: adjusting all different high-rate PCSLs to a low rate, or adjusting all different low-rate PCSLs to a high rate.

An example in which all different high-rate PCSLs are adjusted to a low rate is used for interpretative description. Adjustment from a high rate to a low rate may be implemented by using a PCSL demultiplexing process.

For example, the M electrical signals are two electrical signals, where one is a 400G electrical signal, and the other is a 100G electrical signal. Assuming that the 400G electrical signal includes 20 20 Gbps PCSLs, that is, PCSL0 to PCSL19, and the 20 20 Gbps PCSLs are configured for two physical lanes (PL), where the two PLs are PL0 and PL1. PL0 includes PCSL0, 2, 4, 6, 8, 10, 12, 14, 16, and 18 in sequence, and PL1 includes PCSL1, 3, 5, 7, 9, 11, 13, 15, 17, and 19 in sequence. The 400G electrical signal adapted to the two PLs is demultiplexed as four 100G virtual electrical signals, that is, link0 to link3. Each 100G virtual electrical signal obtained after demultiplexing includes 20 5G PCSLs. The PCSLs of the two PLs are demultiplexed to PCSL0 to PCSL19 of link0 to link3 according to a sequence of PCSL0 to PCSL19. There are many specific methods. For a simple example, the PCSLs in PL0 of the 400G signal are alternately distributed to Link0 and Link2. For example, PCSL0 in PL0 is allocated to Link0, for example, as PCSL0 of Link0; PCSL2 in PL0 is allocated to Link2, for example, as PCSL0 of Link2; PCSL4 in PL0 is allocated to Link0, for example, as PCSL1 of Link0; PCSL6 in PL0 is allocated to Link2, for example, as PCSL1 of Link2; and the like in sequence. The PCSLs in PL1 of the 400G signal are alternately distributed to Link1 and Link3, where a method is similar to the PCSL allocation in PL0, and is not described again.

Data of a high-rate PCSL can be delivered to multiple low-rate PCSLs by demultiplexing the high-rate PCSL, thereby unifying PCSLs on which switching is required to a low-rate level.

Adjusting all different low-rate PCSLs to a high rate may be implemented by using a PCSL multiplexing process. A specific process is reverse to the foregoing process in the foregoing embodiment. Data of a low-rate PCSL is inserted into a high-rate PCSL according to a fixed bit quantity in an interleaved manner, thereby implementing PCSL multiplexing to unify PCSLs on which switching is required to a high-rate level.

It should be noted that in the foregoing solution, there is no requirement for a sequence of performing PCSL synchronization and PCSL rate adjustment on the M electrical signals by the first network device: PCSL synchronization may be performed before PCSL rate adjustment, or PCSL synchronization may be performed before PCSL rate adjustment.

Embodiment 5

Figure 7:
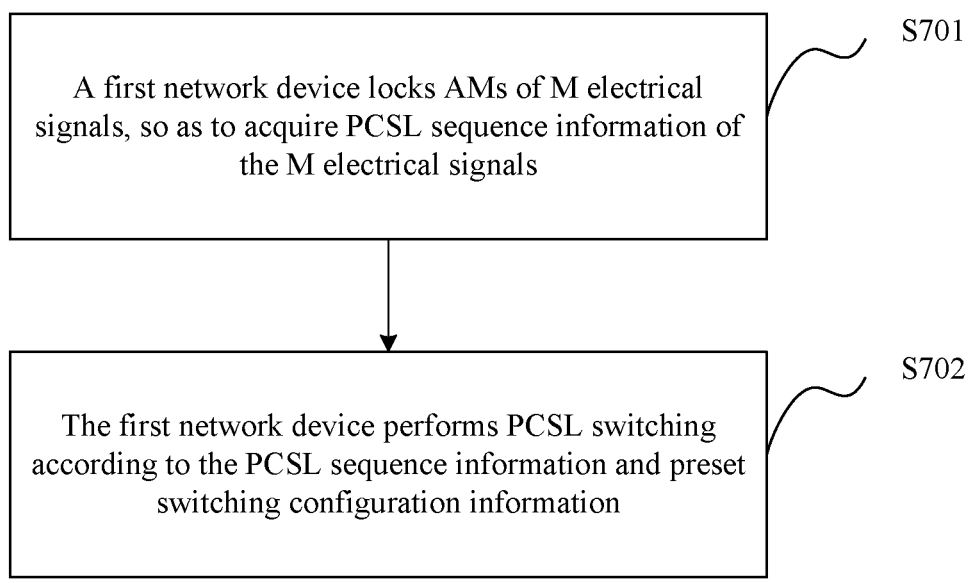
FIG. 7 is a flowchart of an Ethernet signal scheduling method according to Embodiment 5 of the present invention.

This embodiment further provides an Ethernet signal scheduling method. FIG. 7 is a flowchart of an Ethernet signal scheduling method according to Embodiment 5 of the present invention. As shown in FIG. 7, further, before the performing, by a first network device, PCSL switching on M electrical signals, the method further includes:

Step 701. The first network device locks AMs of the M electrical signals, so as to acquire PCSL sequence information of the M electrical signals.

Accordingly, the performing, by a first network device, PCSL switching on M electrical signals in step 601 of the foregoing solution specifically includes:

Step 702. The first network device performs PCSL switching according to the PCSL sequence information and preset switching configuration information.

In PCSLs of the M electrical signals, two adjacent AMs are spaced by a fixed quantity of bits, for example, 16383 bit blocks, where the AM is used to identify a sequence number of a PCSL where the AM is located. The M electrical signals may pass through different transmission paths before being transported to the first network device. Therefore, different transmission latencies may be caused, and consequently, PCSL disorder occurs on the M electrical signals received by the first network device. The first network device acquires the PCSL sequence information of the M electrical signals by locking AMs of the M electrical signals, where the PCSL sequence information may be specifically represented by sequence number information corresponding to the PCSLs; and may perform re-sorting on the PCSLs of the M electrical signals according to the acquired PCSL sequence information. An AM is used to identify a sequence number of a PCSL where the AM is located. The AM specifically includes a synchronization header, M0 to M2, bit interleaved parity (BIP for short, $BIP_3$), M4 to M6, and $BIP_7$. M0 to M2 indicate a code of a sequence number, M4 to M6 are radix-minus-one complement of M0 to M2, and $BIP_7$ is radix-minus-one complement of $BIP_3$. Ethernet signals of different rates correspond to different AM coding rules. For example, for a 40G Ethernet signal, M0 to M2 are 0x90, 0x76, and 0x47, indicating that a sequence number of a PCSL is 0; for a 100G Ethernet signal, M0 to M2 are 0xC1, 0x68, and 0x21, indicating that a sequence number of a PCSL is 0. Specific codes of other sequence numbers are not listed herein one by one.

The preset switching configuration information may be specifically a cross-connect relationship of PCSL switching, for example, the $y^{th}$ PCSL in the $x^{th}$ input electrical signal is switched to the $j^{th}$ PCSL in the $i^{th}$ output Ethernet signal or client signal.

The first network device obtains a PCSL switching configuration according to the PCSL sequence information of the M electrical signals and the preset switching configuration, so as to perform PCSL switching according to the PCSL switching configuration to switch the M electrical signals, to generate N Ethernet signals or client signals.

Further, before the performing, by a first network device, PCSL switching on M electrical signals in step 601 of the foregoing solution, the method further includes:

receiving, by the first network device, an optical signal sent by at least one another network device, and performing optical-to-electrical conversion on the optical signal sent by the another network device, to generate the M electrical signals; or receiving, by the first network device, a client signal sent by at least one second MAC processing device, and performing bit block coding on the client signal sent by the at least one second MAC processing device, to generate the M electrical signals.

Specifically, the first network device may be connected to at least one another network device, or may be connected to at least one user-side device, for example, connected to the at least one second MAC processing device. A signal is transported between the first network device and the at least one another network device by using an optical transport network. An optical signal that is sent by the at least one another network device by using the optical transport network and is received by the first network device needs to be converted into the M electrical signals, so that electrical layer processing is performed on the M electrical signals.

The signal that is sent by the at least one second MAC processing device and is received by the first network device is a client signal sent by a user end, where the client signal includes only corresponding data information and control information. The first network device further needs to perform bit block coding on the client signal, which may be: splitting the client signal according to a fixed quantity of bits, for example, 64 bit, and adding a 2-bit synchronization header, so as to adapt to a bit format of an electrical signal in an MLD structure.

It should be noted that after performing bit block coding, the first network device further needs to perform PCSL delivery according to coded bit blocks, so that the M electrical signals are divided into a corresponding quantity of PCSLs according to different transmission rates of the M electrical signals. For example, if one of the M electrical signals is 40G, four PCSLs are generated by means of delivery; if another electrical signal is 100G 20 PCSLs are generated by means of delivery.

In the foregoing solution, the performing, by the first network device, optical-to-electrical conversion on the optical signal sent by the another network device, to generate the M electrical signals specifically includes:

performing, by the first network device by using OOK demodulation, polarization multiplexing phase demodulation, or polarization multiplexing phase amplitude demodulation, optical-to-electrical conversion on the optical signal sent by the at least one another network device, to generate the M electrical signals.

It should be noted that after optical-to-electrical conversion is performed by means of OOK demodulation, clock recovery further needs to be performed, which generally occurs in a case in which a received optical signal is a short-distance optical signal; after optical-to-electrical conversion is performed by means of polarization multiplexing phase demodulation or phase amplitude demodulation, digital signal extraction further needs to be performed, including frequency mixing, carrier recovery, clock recovery, and the like, which generally occurs in a case in which a received optical signal is a long-distance optical signal.

Further, before the sending, by the first network device, the N Ethernet signals to at least one second network device in step 602 of the foregoing solution, the method further includes:

performing, by the first network device, electrical-to-optical conversion on the N Ethernet signals to generate an optical signal; and accordingly, the sending, by the first network device, the N Ethernet signals to at least one second network device in step 602 of the foregoing solution specifically includes:

sending, by the first network device, the optical signal generated by means of electrical-to-optical conversion to the at least one second network device.

On a basis of the foregoing solution, the performing, by the first network device, electrical-to-optical conversion on the N Ethernet signals to generate an optical signal specifically includes:

performing, by the first network device by using OOK modulation, polarization multiplexing phase modulation, or polarization multiplexing phase amplitude modulation, electrical-to-optical conversion on the N Ethernet signals, to generate the optical signal.

According to the solution in this embodiment, on a basis of the foregoing solution, PCSL switching is performed according to PCSL sequence information of M electrical signals and preset switching configuration information, and an independent PCSL re-sorting step is removed, thereby simplifying the solution and reducing costs.

Embodiment 6

Figure 8:
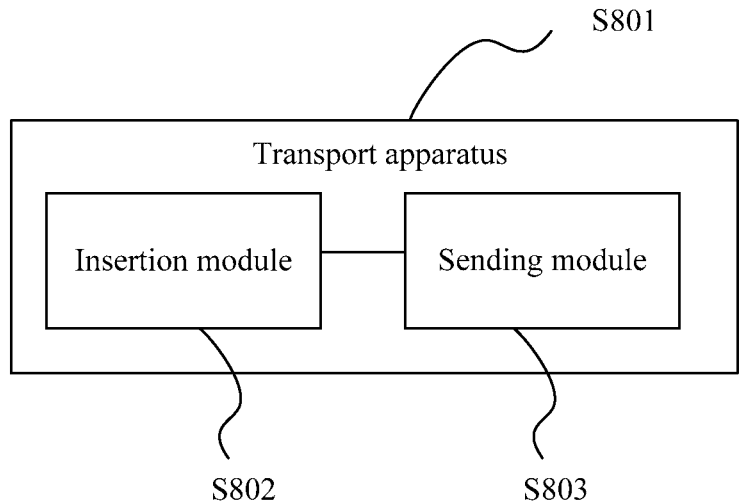
FIG. 8 is a schematic structural diagram of an Ethernet signal transport apparatus according to Embodiment 6 of the present invention.

This embodiment of the present invention further provides an Ethernet signal transport apparatus. FIG. 8 is a schematic structural diagram of an Ethernet signal transport apparatus according to Embodiment 6 of the present invention. As shown in FIG. 8, the transport apparatus 801 specifically includes:

an insertion module 802, configured to insert path monitoring information into a position that is a preset bit length away from an AM in a PCSL of an Ethernet signal; and a sending module 803, configured to send, to at least one second network device, a signal bearing the PCSL into which the path monitoring information is inserted.

In the foregoing solution, the path monitoring information is carried by using an overhead bit block, where the overhead bit block includes at least one bit block.

Further, in the foregoing solution, the path monitoring information includes a regenerator section RS overhead, where the RS overhead is used to monitor a status of signal transmission between signal regenerating terminals.

On a basis of the foregoing solution, the path monitoring information further includes a multiplex section MS overhead, where the MS overhead is used to monitor a status of signal transmission between two multiplexers.

Further, in the solution of the foregoing embodiment, the path monitoring information further includes additional request information, where the additional request information is used to apply to the at least one second network device for monitoring information of a corresponding type.

The monitoring information applied for by using the additional request information includes any one of the following: trail trace identifier TTI information, path type fault location FTFL information, payload structure identifier PSI information, and broadband adjustment-related information.

Further, in the foregoing solution, the insertion module 802 is specifically configured to: insert the path monitoring information into a position that is the preset bit length away from each AM in the PCSL of the Ethernet signal, and perform scrambling on the path monitoring information.

Further, the sending module 803 is further configured to: before the sending module 803 sends the signal bearing the PCSL into which the path monitoring information is inserted to the at least one second network device, perform electrical-to-optical conversion on the signal bearing the PCSL into which the path monitoring information is inserted, to generate an optical signal; and send the optical signal generated by means of electrical-to-optical conversion to the at least one second network device.

In the solution of the foregoing embodiment, the sending module 803 is specifically configured to perform, by using on-off-keying OOK modulation, polarization multiplexing phase modulation, or polarization multiplexing phase amplitude modulation, electrical-to-optical conversion on the signal bearing the PCSL into which the path monitoring information is inserted, to generate the optical signal.

On a basis of the foregoing solution, the sending module 803 is further configured to: before converting the signal bearing the PCSL into which the path monitoring information is inserted, into the optical signal, perform FEC coding on the signal bearing the PCSL into which the path monitoring information is inserted.

It should be noted that the Ethernet signal transport apparatus provided in this embodiment may be integrated into the first network device described in any one of Embodiments 1 to 5, or may be used as an independent transport apparatus and located between the first network device and the second network device described in Embodiments 4 and 5. The Ethernet signal transport apparatus may be applicable to a point-to-point network transport system, or may be applicable to a point-to-multipoint, multipoint-to-point, or multipoint-to-multipoint network transport system. The point-to-multipoint, multipoint-to-point, or multipoint-to-multipoint network transport system may be a network transport system located between a metropolitan area convergence layer and a backbone network.

The Ethernet signal transport apparatus provided in the solution of this embodiment may implement the Ethernet signal transport method in the solution of the foregoing embodiment. A specific implementation process and a beneficial effect of the Ethernet signal transport apparatus are similar to those of the foregoing embodiment, and are not described herein again.

Embodiment 7

Figure 9:
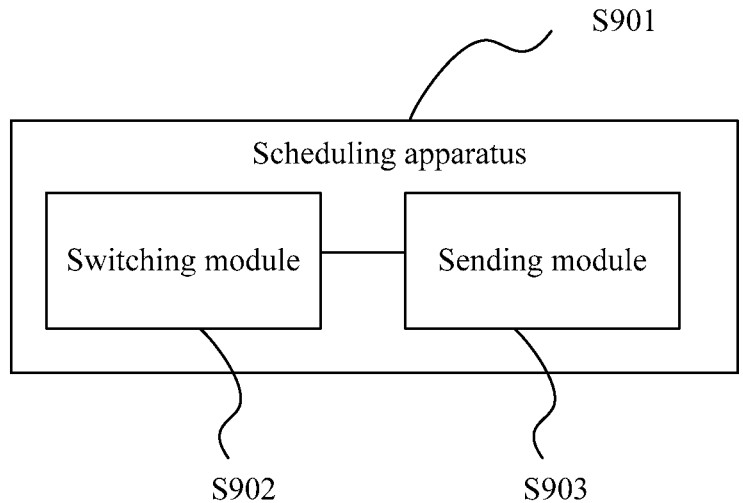
FIG. 9 is a schematic structural diagram of an Ethernet signal scheduling apparatus according to Embodiment 7 of the present invention.

This embodiment of the present invention further provides an Ethernet signal scheduling apparatus. FIG. 9 is a schematic structural diagram of an Ethernet signal scheduling apparatus according to Embodiment 7 of the present invention. As shown in FIG. 9, the scheduling apparatus 901 specifically includes:

a switching module 902, configured to perform PCSL switching on M electrical signals to generate N Ethernet signals or N client signals, where M≥1, N≥1, and M and N cannot be 1 at the same time; and a sending module 903, configured to send the N Ethernet signals to at least one second network device; or send the N client signals to at least one first MAC processing device.

Further, the scheduling apparatus 901 further includes:

an alignment module, configured to: before the switching module 902 performs PCSL switching on the M electrical signals, perform PCSL synchronization on the M electrical signals, so that PSCLs of the M electrical signals have a same clock frequency and AM phase.

In the solution of the foregoing embodiment, the alignment module is specifically configured to perform PCSL synchronization by inserting or deleting an idle bit block in the M electrical signals.

Further, the alignment module is further configured to: before the switching module 902 performs PCSL switching on the M electrical signals, perform rate adjustment on the M electrical signals, so that the PSCLs of the M electrical signals have a same nominal bit rate.

On a basis of the solution in the foregoing embodiment, the scheduling apparatus 901 further includes:

a locking module, configured to: before the switching module 902 performs PCSL switching on the M electrical signals, lock AMs of the M electrical signals, so as to acquire PCSL sequence information of the M electrical signals.

Accordingly, the switching module 902 is further configured to perform PCSL switching according to the PCSL sequence information and preset switching configuration information.

Further, the scheduling apparatus 901 further includes:

a first receiving module, configured to: before the switching module performs PCSL switching on the M electrical signals, receive an optical signal sent by at least one another network device, and perform optical-to-electrical conversion on the optical signal sent by the at least one another network device, to generate the M electrical signals; or the scheduling apparatus 901 further includes:

a second receiving module, configured to: receive a client signal sent by at least one second MAC processing device, and perform bit block coding on the client signal sent by the at least one second MAC processing device, to generate the M electrical signals.

Further, in the solution of the foregoing embodiment, the first receiving module is specifically configured to perform, by using OOK demodulation, polarization multiplexing phase demodulation, or polarization multiplexing phase amplitude demodulation, optical-to-electrical conversion on the optical signal sent by the at least one another network device, to generate the M electrical signals.

On a basis of the solution in the foregoing embodiment, the sending module 903 is further configured to: before the sending module 903 sends the N Ethernet signals to the at least one second network device, perform electrical-to-optical conversion on the N Ethernet signals to generate an optical signal; and send the optical signal generated by means of electrical-to-optical conversion to the at least one second network device.

Further, in the foregoing solution, the sending module 903 is specifically configured to perform, by using OOK modulation, polarization multiplexing phase modulation, or polarization multiplexing phase amplitude modulation, electrical-to-optical conversion on the N Ethernet signals, to generate the optical signal.

It should be noted that the Ethernet signal scheduling apparatus may be integrated into the first network device described in Embodiments 1 to 3 and Embodiment 6, or may be independently used as a scheduling apparatus and located between the first network device and the second network device or the user-side device such as a MAC processing device, described in Embodiments 1 to 3 and Embodiment 6. The Ethernet signal scheduling apparatus may constitute a system together with the Ethernet signal transport apparatus in Embodiment 6, where the system can support effective transport and scheduling of an Ethernet signal, for example, a network transport system located between a metropolitan area convergence layer and a backbone network. Especially, the Ethernet signal scheduling apparatus may also constitute a system together with another sending module and receiving module instead of the Ethernet signal transport apparatus in Embodiment 6, for interconnection between multiple devices at a site, for example, an internal network system of a data center.

The Ethernet signal scheduling apparatus provided in the solution of this embodiment may implement the Ethernet signal scheduling method in the solution of the foregoing embodiment. A specific implementation process and a beneficial effect of the Ethernet signal scheduling apparatus are similar to those of the foregoing embodiment, and are not described herein again.

Embodiment 8

Figure 10:
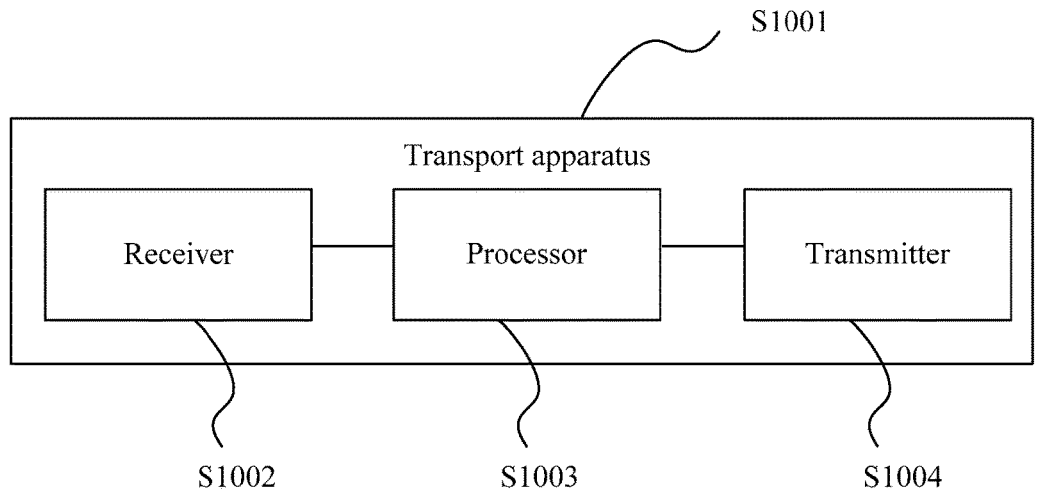
FIG. 10 is a schematic structural diagram of an Ethernet signal transport apparatus according to Embodiment 8 of the present invention.

This embodiment of the present invention further provides an Ethernet signal transport apparatus. FIG. 10 is a schematic structural diagram of an Ethernet signal transport apparatus according to Embodiment 8 of the present invention. As shown in FIG. 10, the transport apparatus 1001 includes: a receiver 1002, a processor 1003, and a transmitter 1004.

The processor 1003 is configured to insert path monitoring information into a position that is a preset bit length away from an alignment marker AM in a PCSL of an Ethernet signal.

The transmitter 1004 is configured to send, to at least one second network device, a signal bearing the PCSL into which the path monitoring information is inserted.

In the foregoing solution, the path monitoring information is carried by using an overhead bit block, where the overhead bit block includes at least one bit block.

Further, the path monitoring information includes a regenerator section RS overhead, where the RS overhead is used to monitor a status of signal transmission between signal regenerating terminals.

Further, the path monitoring information further includes a multiplex section MS overhead, where the MS overhead is used to monitor a status of signal transmission between two multiplexers.

On a basis of the foregoing solution, the path monitoring information further includes additional request information, where the additional request information is used to apply to the at least one second network device for monitoring information of a corresponding type.

The monitoring information applied for by using the additional request information includes any one of the following: trail trace identifier TTI information, path type fault location FTFL information, payload structure identifier PSI information, and broadband adjustment-related information.

Further, in the foregoing solution, the processor 1003 is configured to: insert the path monitoring information into a position that is the preset bit length away from each AM in the PCSL of the Ethernet signal, and perform scrambling on the path monitoring information.

In the foregoing solution, the transmitter 1004 is further configured to: before the transmitter sends the signal bearing the PCSL into which the path monitoring information is inserted to the at least one second network device, perform electrical-to-optical conversion on the signal bearing the PCSL into which the path monitoring information is inserted, to generate an optical signal; and send the optical signal generated by means of electrical-to-optical conversion to the at least one second network device.

Further, in the solution of the foregoing embodiment, the transmitter 1004 is further configured to perform, by the first network device by using on-off-keying OOK modulation, polarization multiplexing phase modulation, or polarization multiplexing phase amplitude modulation, electrical-to-optical conversion on the signal bearing the PCSL into which the path monitoring information is inserted, to generate the optical signal.

In the solution of the foregoing embodiment, the transmitter 1004 is further configured to: before performing electrical-to-optical conversion on the signal bearing the PCSL into which the path monitoring information is inserted, to generate the optical signal, perform forward error correction FEC coding on the signal bearing the PCSL into which the path monitoring information is inserted.

The Ethernet signal transport apparatus provided in this embodiment may be integrated into the first network device described in Embodiments 1 to 7, or may be used as an independent transfer apparatus and located between the first network device and the second network device described in Embodiments 4 and 5, and Embodiment 7. The Ethernet signal transport apparatus may be applicable to a point-to-point network transport system, or may be applicable to a point-to-multipoint, multipoint-to-point, or multipoint-to-multipoint network transport system. The point-to-multipoint, multipoint-to-point, or multipoint-to-multipoint network transport system may be a network transport system located between a metropolitan area convergence layer and a backbone network.

The Ethernet signal transport apparatus provided in the solution of this embodiment may implement the Ethernet signal transport method in the solution of the foregoing embodiment. A specific implementation process and a beneficial effect of the Ethernet signal transport apparatus are similar to those of the foregoing embodiment, and are not described herein again.

Embodiment 9

Figure 11:
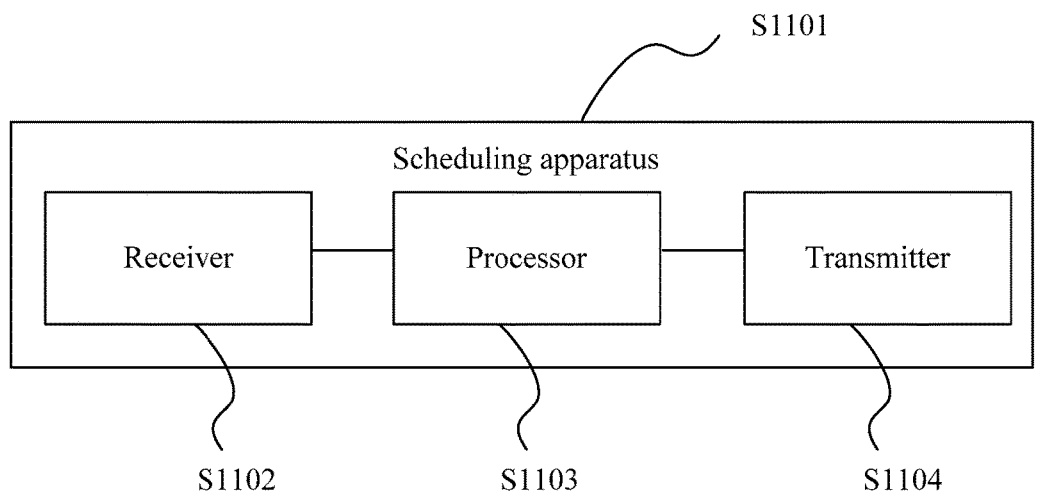
FIG. 11 is a schematic structural diagram of an Ethernet signal scheduling apparatus according to Embodiment 9 of the present invention.

This embodiment of the present invention further provides an Ethernet signal scheduling apparatus. FIG. 11 is a schematic structural diagram of an Ethernet signal scheduling apparatus according to Embodiment 9 of the present invention. As shown in FIG. 11, the scheduling apparatus 1101 includes: a receiver 1102, a processor 1103, and a transmitter 1104.

The processor 1103 is configured to perform PCSL switching on M electrical signals to generate N Ethernet signals or N client signals, where M≥1, N≥1, and M and N cannot be 1 at the same time.

The transmitter 1104 is configured to send the N Ethernet signals to at least one second network device; or send the N client signals to at least one first Medium Access Control MAC processing device.

In the solution of the foregoing embodiment, the processor 1103 is further configured to: before performing PCSL switching on the M electrical signals, perform PCSL synchronization on the M electrical signals, so that PSCLs of the M electrical signals have a same clock frequency and AM phase.

Further, the processor 1103 is further configured to perform PCSL synchronization by inserting or deleting an idle bit block in the M electrical signals.

On a basis of the solution in the foregoing embodiment, the processor 1103 is further configured to: before performing PCSL switching on the M electrical signals, perform rate adjustment on the M electrical signals, so that the PSCLs of the M electrical signals have a same nominal bit rate.

Further, in the solution of the foregoing embodiment, the processor 1103 is further configured to: before performing PCSL switching on the M electrical signals, lock AMs of the M electrical signals, so as to acquire PCSL sequence information of the M electrical signals; and perform PCSL switching according to the PCSL sequence information and preset switching configuration information.

In the foregoing solution, the receiver 1102 is configured to: before PCSL switching is performed on the M electrical signals, receive an optical signal sent by at least one another network device, and perform optical-to-electrical conversion on the optical signal sent by the at least one another network device, to generate the M electrical signals;

or the receiver 1102 is configured to: receive a client signal sent by at least one second MAC processing device, and perform bit block coding on the client signal sent by the at least one second MAC processing device, to generate the M electrical signals.

In the solution of the foregoing embodiment, the receiver 1102 is specifically configured to perform, by using OOK demodulation, polarization multiplexing phase demodulation, or polarization multiplexing phase amplitude demodulation, optical-to-electrical conversion on the optical signal sent by the at least one another network device, to generate the M electrical signals.

Further, in the solution of the foregoing embodiment, the transmitter 1104 is further configured to: before the first network device sends the N Ethernet signals to the at least one second network device, perform electrical-to-optical conversion on the N Ethernet signals to generate an optical signal; and send the optical signal generated by means of electrical-to-optical conversion to the at least one second network device.

In the foregoing solution, the transmitter 1104 is further configured to perform, by using OOK modulation, polarization multiplexing phase modulation, or polarization multiplexing phase amplitude modulation, electrical-to-optical conversion on the N Ethernet signals, to generate the optical signal.

It should be noted that the Ethernet signal scheduling apparatus provided in this embodiment may be integrated into the first network device described in Embodiments 1 to 3, Embodiment 6, and Embodiment 8, or may be used as an independent scheduling apparatus and located between the first network device and the second network device described in Embodiments 1 to 3, Embodiment 6, and Embodiment 8. The Ethernet signal scheduling apparatus may constitute a system together with the Ethernet signal transport apparatus in Embodiment 6 or Embodiment 8, where the system can support effective transport and scheduling of an Ethernet signal, for example, a network transport system located between a metropolitan area convergence layer and a backbone network. Especially, the Ethernet signal scheduling apparatus may also constitute a system together with another sending module and receiving module instead of the Ethernet transport apparatus in Embodiment 6 or Embodiment 8, for interconnection between multiple devices at a site, for example, an internal network system of a data center. In this case, only scheduling needs to be performed on an Ethernet signal.

The Ethernet signal scheduling apparatus provided in the solution of this embodiment may implement the Ethernet signal scheduling method in the solution of the foregoing embodiment. A specific implementation process and a beneficial effect of the Ethernet signal scheduling apparatus are similar to those of the foregoing embodiment, and are not described herein again.

Embodiment 10

Figure 12:
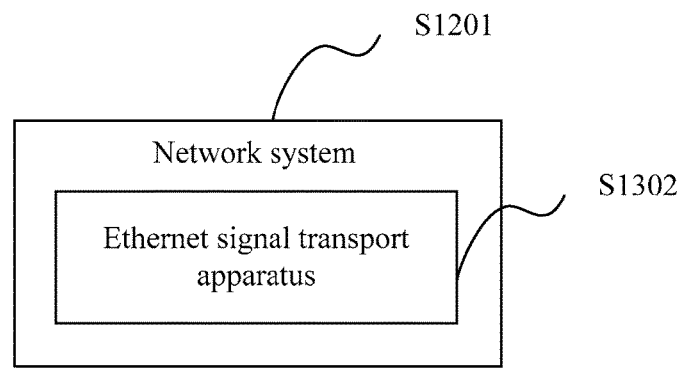
FIG. 12 is a schematic structural diagram of a network system according to Embodiment 10 of the present invention.

This embodiment provides a network system. FIG. 12 is a schematic structural diagram of a network system according to Embodiment 10 of the present invention. As shown in FIG. 12, the network system 1201 includes at least an Ethernet signal transport apparatus 1202.

The Ethernet signal transport apparatus 1202 may be the foregoing transport apparatus in Embodiment 6 or Embodiment 8.

The network system may be a point-to-point network transport system, or may be a point-to-multipoint network transport system. In the network system, path monitoring information may be inserted by using the transport apparatus, so that reliable transport of an Ethernet signal is implemented based on the path monitoring information.

A specific structural composition, an implementation process, and interpretative description of the transport apparatus are similar to those in the foregoing embodiment, and are not described herein again.

Embodiment 11

Figure 13:
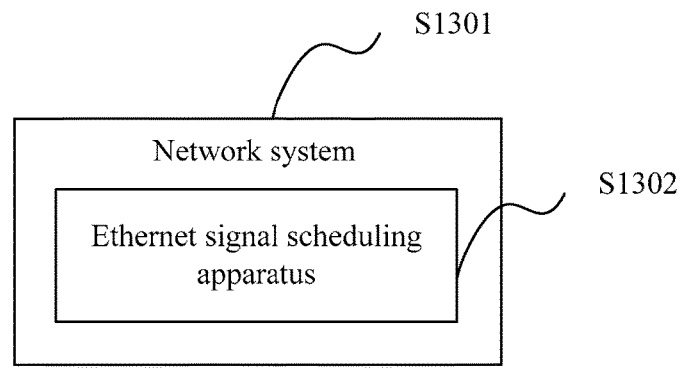
FIG. 13 is a schematic structural diagram of a network system according to Embodiment 11 of the present invention.

This embodiment provides a network system. FIG. 13 is a schematic structural diagram of a network system according to Embodiment 11 of the present invention. As shown in FIG. 13, the network system 1301 includes at least an Ethernet signal scheduling apparatus 1302.

The Ethernet signal scheduling apparatus 1302 may be the scheduling apparatus described in Embodiment 7 or Embodiment 9.

The network system may be used for interconnection between multiple devices at a site, for example, an internal network system of a data center. In the network system, an Ethernet signal may be effectively scheduled by using the scheduling apparatus.

A specific structural composition, an implementation process, and interpretative description of the transport apparatus are similar to those in the foregoing embodiment, and are not described herein again.

Embodiment 12

Figure 14:
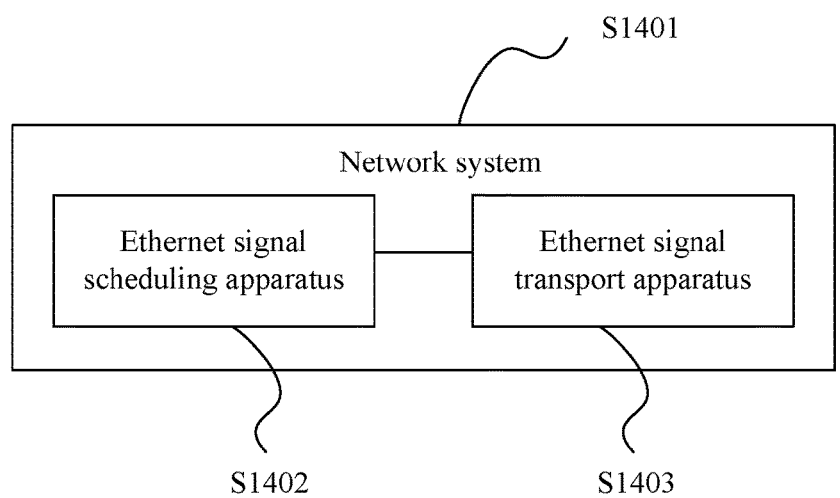
FIG. 14 is a schematic structural diagram of a network system according to Embodiment 12 of the present invention.

This embodiment provides a network system. FIG. 14 is a schematic structural diagram of a network system according to Embodiment 12 of the present invention. As shown in FIG. 14, the network system 1401 includes at least an Ethernet signal scheduling apparatus 1402 and an Ethernet signal transport apparatus 1403.

The Ethernet signal scheduling apparatus 1402 may be the foregoing transport apparatus in Embodiment 6 or Embodiment 8.

The Ethernet signal transport apparatus 1403 may be the foregoing scheduling apparatus in Embodiment 7 or Embodiment 9.

The network system may be a point-to-multipoint, multipoint-to-point, or multipoint-to-multipoint network transport system, for example, a network transport system located between a metropolitan area convergence layer and a backbone network. In the network system, reliable transport and effective scheduling of an Ethernet signal may be implemented.

A specific implementation process and interpretative description of the network system provided in this embodiment are similar to those in the foregoing embodiment, and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An Ethernet signal scheduling method, comprising:
performing, by a first network device, scheduling on M electrical signals by performing physical coding sublayer lane (PCSL) switching on the M electrical signals to generate N scheduled Ethernet signals or N scheduled client signals, wherein M≥1, N≥1, and M and N are not both equal to 1; and
sending, by the first network device, the N scheduled Ethernet signals to at least one second network device; or sending, by the first network device, the N scheduled client signals to at least one first Medium Access Control (MAC) processing device.

2. The method according to claim 1, wherein before performing the PCSL switching on the M electrical signals, the method further comprises:
performing, by the first network device, PCSL synchronization on the M electrical signals, so that PCSLs of the M electrical signals have a same clock frequency and alignment marker (AM) phase.

3. The method according to claim 2, wherein before performing the PCSL switching on the M electrical signals, the method further comprises:
performing, by the first network device, PCSL rate adjustment on the M electrical signals, so that the PCSLs of the M electrical signals have a same nominal bit rate.

4. The method according to claim 1, wherein before performing the PCSL switching on the M electrical signals, the method further comprises:
locking, by the first network device, alignment markers (AMs) of the M electrical signals, so as to acquire PCSL sequence information of the M electrical signals; and
wherein performing the PCSL switching on the M electrical signals comprises:
performing, by the first network device, PCSL switching according to the PCSL sequence information and preset switching configuration information.

5. An Ethernet signal scheduling apparatus, comprising:
a receiver;
a processor configured to perform scheduling on M electrical signals by performing physical coding sublayer lane (PCSL) switching on the M electrical signals to generate N Ethernet signals or N client signals, wherein M≥1, N≥1, and M and N are not both equal to 1; and
a transmitter configured to send the N Ethernet signals to at least one second network device or send the N client signals to at least one first Medium Access Control (MAC) processing device.

6. The apparatus according to claim 5, wherein the processor is further configured to, before performing PCSL switching on the M electrical signals, perform PCSL synchronization on the M electrical signals, so that PCSLs of the M electrical signals have a same clock frequency and alignment marker (AM) phase.

7. The apparatus according to claim 6, wherein the processor is further configured to perform PCSL synchronization by inserting or deleting an idle bit block in the M electrical signals.

8. The apparatus according to claim 6, wherein the processor is further configured to, before performing PCSL switching on the M electrical signals, perform PCSL rate adjustment on the M electrical signals, so that the PCSLs of the M electrical signals have a same nominal bit rate.

9. The apparatus according to claim 5, wherein the processor is further configured to:
before performing PCSL switching on the M electrical signals, lock alignment markers (AMs) of the M electrical signals, so as to acquire PCSL sequence information of the M electrical signals; and
perform PCSL switching according to the PCSL sequence information and switching configuration information.

* * * * *